US010993272B2

(12) United States Patent
Johansson et al.

(10) Patent No.: US 10,993,272 B2
(45) Date of Patent: Apr. 27, 2021

(54) EFFICIENT DELIVERY METHOD AND APPARATUSES FOR INFREQUENT SMALL DATA

(71) Applicant: Telefonaktiebolaget LM Ericsson (publ), Stockholm (SE)

(72) Inventors: Kaj Johansson, Gothenburg (SE); Gunnar Rydnell, Gothenburg (SE); Stefan Rommer, Västra Frölunda (SE); Jan Backman, Kärna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/785,195

(22) Filed: Oct. 16, 2017

(65) Prior Publication Data
US 2018/0042057 A1 Feb. 8, 2018

Related U.S. Application Data

(63) Continuation of application No. PCT/EP2017/066677, filed on Jul. 4, 2017.
(Continued)

(30) Foreign Application Priority Data

Jul. 4, 2016 (WO) .................. PCT/EP2016/065734

(51) Int. Cl.
*H04W 76/10* (2018.01)
*H04L 29/06* (2006.01)
*H04W 72/04* (2009.01)

(52) U.S. Cl.
CPC ............. *H04W 76/10* (2018.02); *H04L 69/22* (2013.01); *H04W 72/04* (2013.01)

(58) Field of Classification Search
CPC ...... H04L 41/5077; H04L 69/22; H04W 4/70; H04W 28/0215; H04W 28/0289;
(Continued)

(56) References Cited

U.S. PATENT DOCUMENTS 8,867,476 B2 * 10/2014 Jain ........................ H04B 15/00
370/329
8,923,210 B2 * 12/2014 Jain ........................ H04B 15/00
370/328
(Continued)

FOREIGN PATENT DOCUMENTS

CN     104602304 A  *  5/2015
EP       2566199 A1     3/2013
(Continued)

OTHER PUBLICATIONS

Vodafone, Transfer and update of solution of small data transfer in NAS signalling, Jul. 13, 2012, 3GPP, Tdoc: S2-123077 (Year: 2012).*
Vodafone, Transfer and update of solution of small data transfer in NAS signalling, Jul. 13, 2012, 3GPP, Tdoc: S2-123112 (Year: 2012).*
(Continued)

*Primary Examiner* — Eric Nowlin
(74) *Attorney, Agent, or Firm* — Withrow & Terranova, PLLC

(57) ABSTRACT

Systems and methods for efficient delivery of infrequent small data are provided. A system for providing communication infrequent small Protocol Data Units (PDUs) to/from a UE includes an Access Node (AN); a session management functions node; and a User Plane (UP) functions entity. The session management functions node receives a session setup request and selects the UP functions entity and a tunnel identifier associated with the UE. In case of an IP PDU session type, trigger an establishment of a UP. The UP functions entity creates a UE context for the UE; stores the UE context for the UE; completes an establishment in a Control Plane (CP); and provides the AN with uplink tunnel
(Continued)

SMALL DATA ARCHITECTURE information. The AN stores the UE context and transmits a session setup response to the UE. In this way, an improved ratio of the signalling/user data relation may be obtained for devices sending infrequent small data.

15 Claims, 12 Drawing Sheets

Related U.S. Application Data

(60) Provisional application No. 62/358,490, filed on Jul. 5, 2016.

(58) Field of Classification Search
CPC ..... H04W 48/02; H04W 48/08; H04W 60/04; H04W 72/04; H04W 76/10
See application file for complete search history.

(56) References Cited

U.S. PATENT DOCUMENTS

| | | | | |
|---|---|---|---|---|
| 9,049,588 | B2* | 6/2015 | Choi | H04W 8/245 |
| 9,401,820 | B2* | 7/2016 | Kim | H04L 51/38 |
| 9,603,186 | B2* | 3/2017 | Jain | H04W 76/38 |
| 9,681,354 | B2* | 6/2017 | Bangolae | H04W 76/14 |
| 9,967,858 | B2* | 5/2018 | Bangolae | H04W 36/14 |
| 10,085,296 | B1* | 9/2018 | Estrella Chavez | H04W 76/12 |
| 10,129,688 | B2* | 11/2018 | Kim | H04L 51/38 |
| 2012/0252481 | A1 | 10/2012 | Anpat et al. | |
| 2012/0282956 | A1* | 11/2012 | Kim | H04L 51/38 455/466 |
| 2013/0308564 | A1* | 11/2013 | Jain | H04B 15/00 370/329 |
| 2014/0003357 | A1 | 1/2014 | Ejzak et al. | |
| 2014/0016614 | A1* | 1/2014 | Velev | H04W 4/70 370/331 |
| 2014/0242962 | A1* | 8/2014 | Choi | H04W 8/245 455/418 |
| 2014/0254490 | A1* | 9/2014 | Jain | H04B 15/00 370/328 |
| 2015/0043449 | A1* | 2/2015 | Bangolae | H04W 76/14 370/329 |
| 2015/0223284 | A1* | 8/2015 | Jain | H04J 11/00 370/329 |
| 2015/0327327 | A1* | 11/2015 | Jain | H04W 76/38 370/328 |
| 2015/0373733 | A1* | 12/2015 | Bangolae | H04W 36/14 370/329 |
| 2016/0212638 | A1* | 7/2016 | Jain | H04W 4/70 |
| 2016/0374048 | A1* | 12/2016 | Griot | H04W 4/70 |
| 2017/0006407 | A1* | 1/2017 | Kim | H04L 51/38 |
| 2017/0094711 | A1* | 3/2017 | Hu | H04W 74/0833 |
| 2017/0215142 | A1* | 7/2017 | Kim | H04W 52/0225 |
| 2017/0251516 | A1* | 8/2017 | Bangolae | H04W 76/27 |
| 2018/0255597 | A1* | 9/2018 | Yu | H04W 16/18 |
| 2018/0317194 | A1* | 11/2018 | Chen | H04W 60/04 |
| 2019/0191483 | A1* | 6/2019 | Ryoo | H04W 76/27 |

FOREIGN PATENT DOCUMENTS

| | | | | |
|---|---|---|---|---|
| EP | 2768251 A1 | 8/2014 | | |
| JP | 2015508583 A | 3/2015 | | |
| JP | 2015531209 A | 10/2015 | | |
| RU | 2637467 C2 * | 12/2017 | ........ | H04W 52/0235 |
| WO | WO-2014052877 A1 * | 4/2014 | .............. | H04W 4/70 |
| WO | 2015013038 A1 | 1/2015 | | |
| WO | 2015018074 A1 | 2/2015 | | |
| WO | WO-2016204985 A1 * | 12/2016 | .............. | H04W 4/70 |
| WO | WO-2018194971 A1 * | 10/2018 | .............. | H04W 4/08 |

OTHER PUBLICATIONS

Vodafone, Transfer and update of solution of small data transfer in NAS signalling, Jul. 13, 2012, 3GPP, Tdoc: S2-123414 (Year: 2012).*
3GPP, Study on security aspects of Machine-Type Communications (MTC) and other mobile data applications communications enhancements (Release 12), Jun. 2016, 3GPP TR 33.868, Version 12.1.0 (Year: 2014).*
Da Silva et al., 5G RAN Design Workshop: A Novel State Model for 5G Radio Access Networks, May 27, 2016, IEEE, International Conference on Communications (ICC) 2016 (Year: 2016).*
Nokia et al., Efficient small data transmission, Apr. 15, 2016, 3GPP, 3GPP TSG-RAN WG2 Meeting #93bis, Tdoc: R2-162367 (Year: 2016).*
Huawei et al., Low latency and low overhead transmission for NR, Apr. 15, 2016, 3GPP, 3GPP TSG-RAN WG2 Meeting #93bis, Tdoc: R2-162662 (Year: 2016).*
Ericsson, Handling of inactive UEs, Apr. 15, 2016, 3GPP, 3GPP TSG-RAN WG2 #93bis, Tdoc: R2-162760 (Year: 2016).*
CATT, Inactive state and RAN based notification area, Oct. 14, 2016, 3GPP, 3GPP TSG RAN WG2 Meeting #95bis, Tdoc: R2-166116 (Year: 2016).*
CATT, Small data transmission in inactive state, Oct. 14, 2016, 3GPP, 3GPP TSG RAN WG2 Meeting #95bis, Tdoc: R2-R2-166118 (Year: 2016).*
Andreev, Sergey et al., "Efficient Small Data Access for Machine-Type Communications in LTE," IEEE International Conference on Communications (ICC)—Next Generation Networking Symposium, Jun. 9-13, 2013, Budapest, Hungary, IEEE, pp. 3569-3574.
Author Unknown, "Network Functions Virtualisation (NFV); Architectural Framework," ETSI GS NFV 002, Version 1-1-1, Oct. 2013, European Telecommunications Standards Institute (ETSI), 21 pages.
Author Unknown, "Technical Specification Group Services and System Aspects; Study on Architecture for Next Generation System (Release 14)," Technical Report 23.799, Version 0.5.0, 3GPP Organizational Partners, May 2016, 178 pages.
Ericsson, "S2-163121: Updates to solution 6.3.2," 3rd Generation Partnership Project (3GPP), SA WG2 Meeting #115, May 23-27, 2016, 3 pages, Nanjing, China.
Ericsson, "S3-161408: Security solution for Infrequent Small Data," 3rd Generation Partnership Project (3GPP), TSG SA WG3 (Security) Adhoc Meeting on FS_NSA, Sep. 27-29, 2016, 8 pages, San Diego, USA.
Nokia et al., "R2-163441: Discussion of RRC States in NR," 3rd Generation Partnership Project (3GPP), TSG-RAN WG2 Meeting #94, May 23-27, 2016, 6 pages, Nanjing, China.
Rao, V. Srinivasa et al., "Protocol Signaling Procedures in LTE," White Paper, Sep. 2011, http://go.radisys.com/rs/radisys/images/paper-lte-protocol-signaling.pdf, Radisys Corporation, pp. 1-11.
Thomson, Susan et al., "IPv6 Stateless Address Autoconfiguration," Network Working Group, RFC: 4862, Category: Standards Track, Sep. 2007, The IETF Trust, pp. 1-30.
International Search Report and Written Opinion for International Patent Application No. PCT/EP2017/066677, dated Sep. 18, 2017, 25 pages.
Notice of Reasons for Refusal for Japanese Patent Application No. 2018-568692, dated Feb. 12, 2020, 8 pages.
Examination Report for Indian Patent Application No. 201837049612, dated Aug. 31, 2020, 6 pages.
Ericsson, "R2-163998: Handling of inactive UEs," 3GPP TSG-RAN WG2 #94, May 23-27, 2016, Nanjing, China, 6 pages.
Examination Report for European Patent Application No. 17740321.9, dated Dec. 23, 2020, 10 pages.
Decision of Refusal for Japanese Patent Application No. 2018-568692, dated Nov. 4, 2020, 4 pages.

* cited by examiner

SMALL DATA ARCHITECTURE

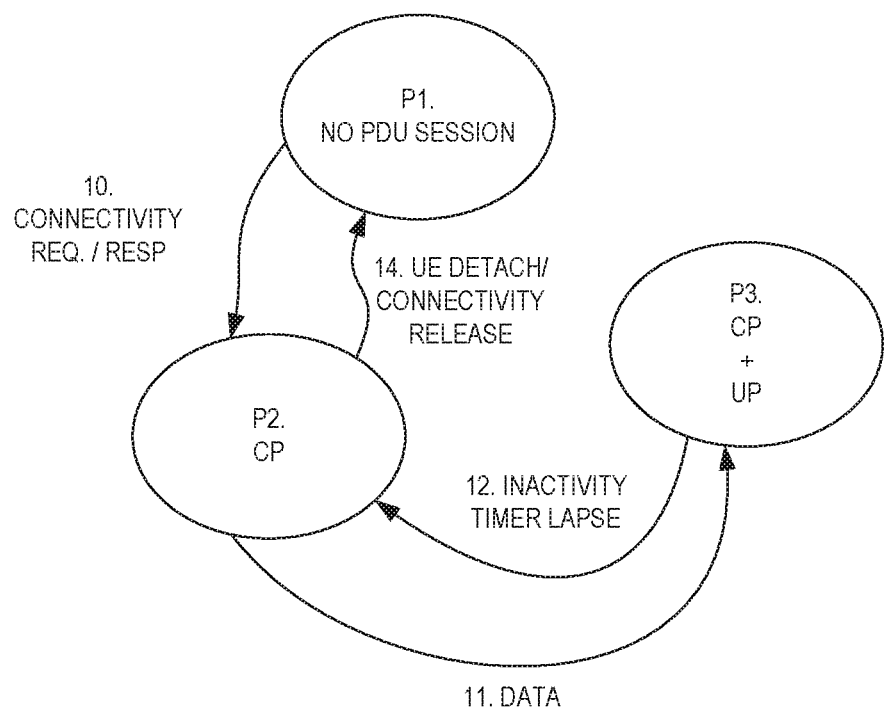
*FIG. 2 – STATES*
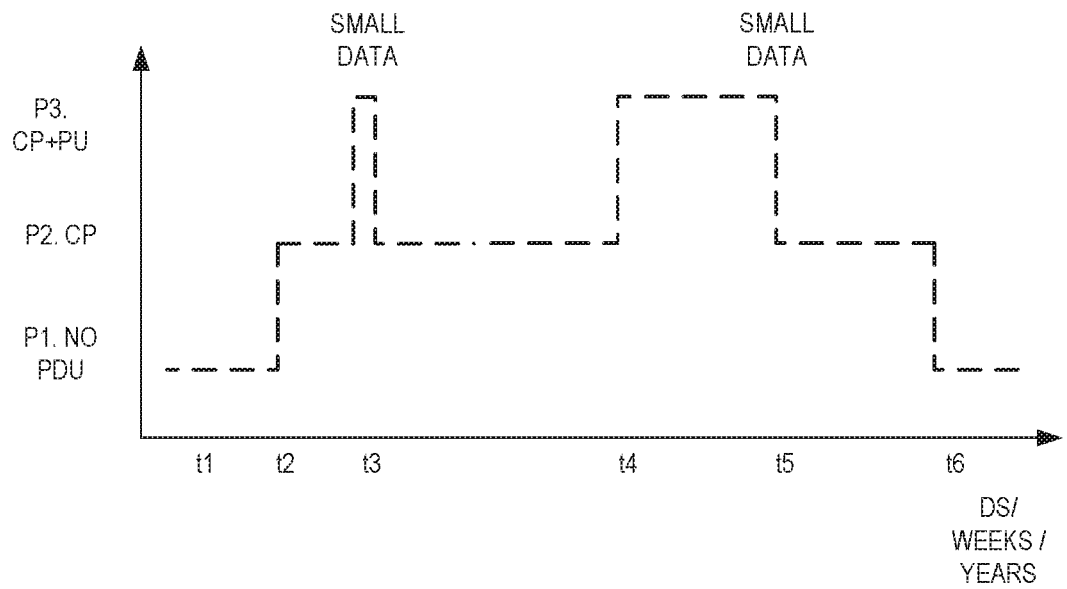
*FIG. 3 – EXEMPLARY SMALL DATA SCENARIO*

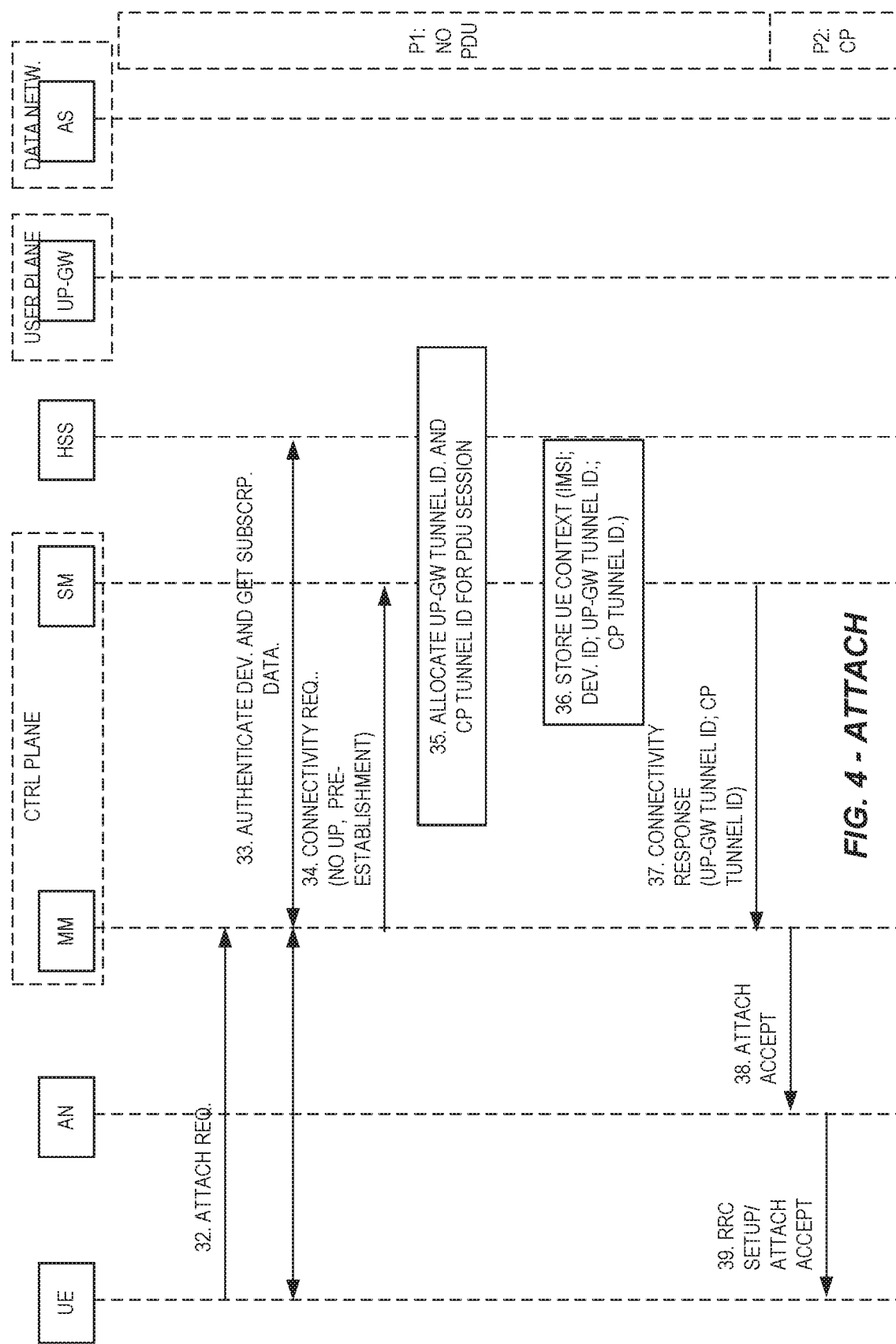
FIG. 4 - ATTACH

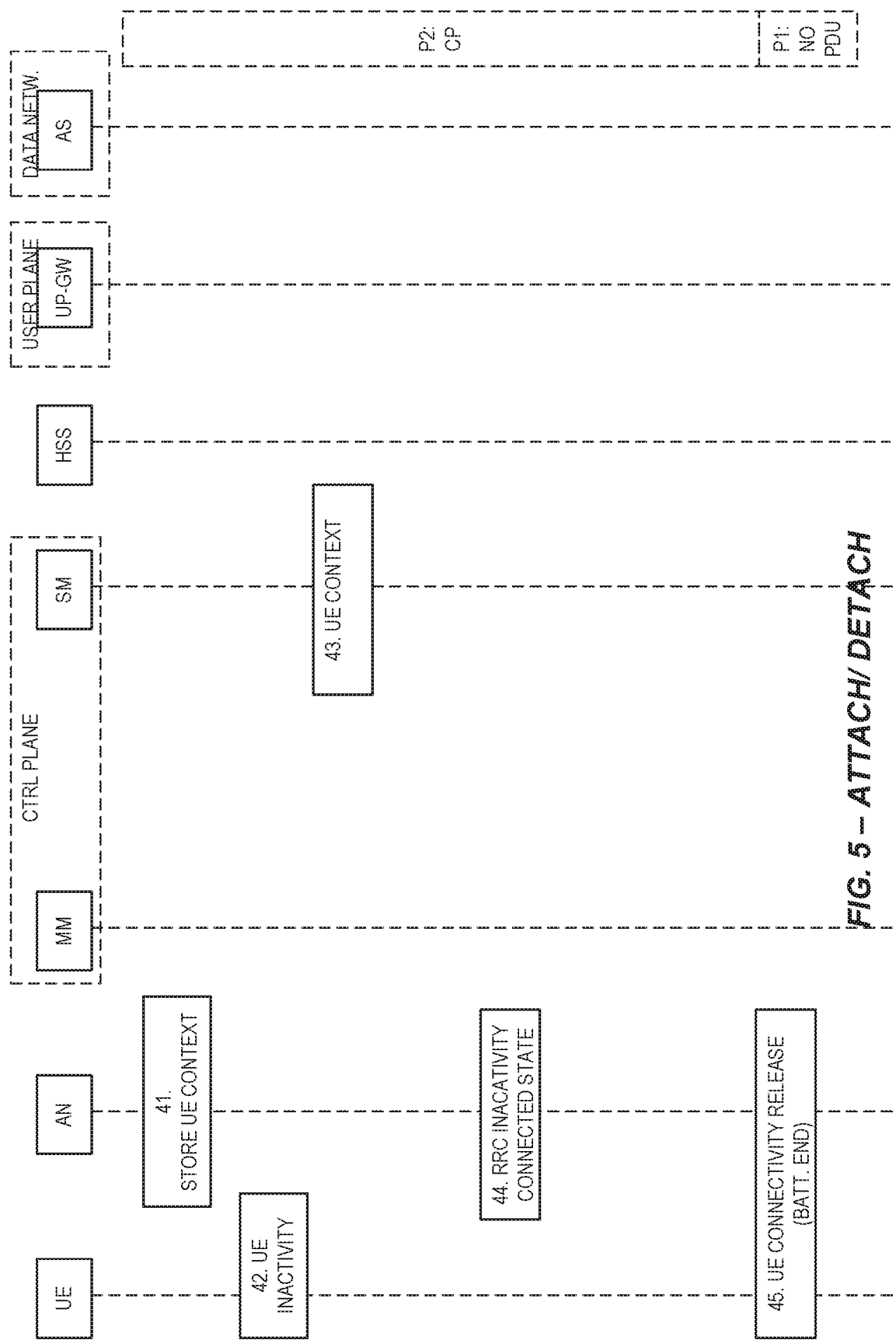

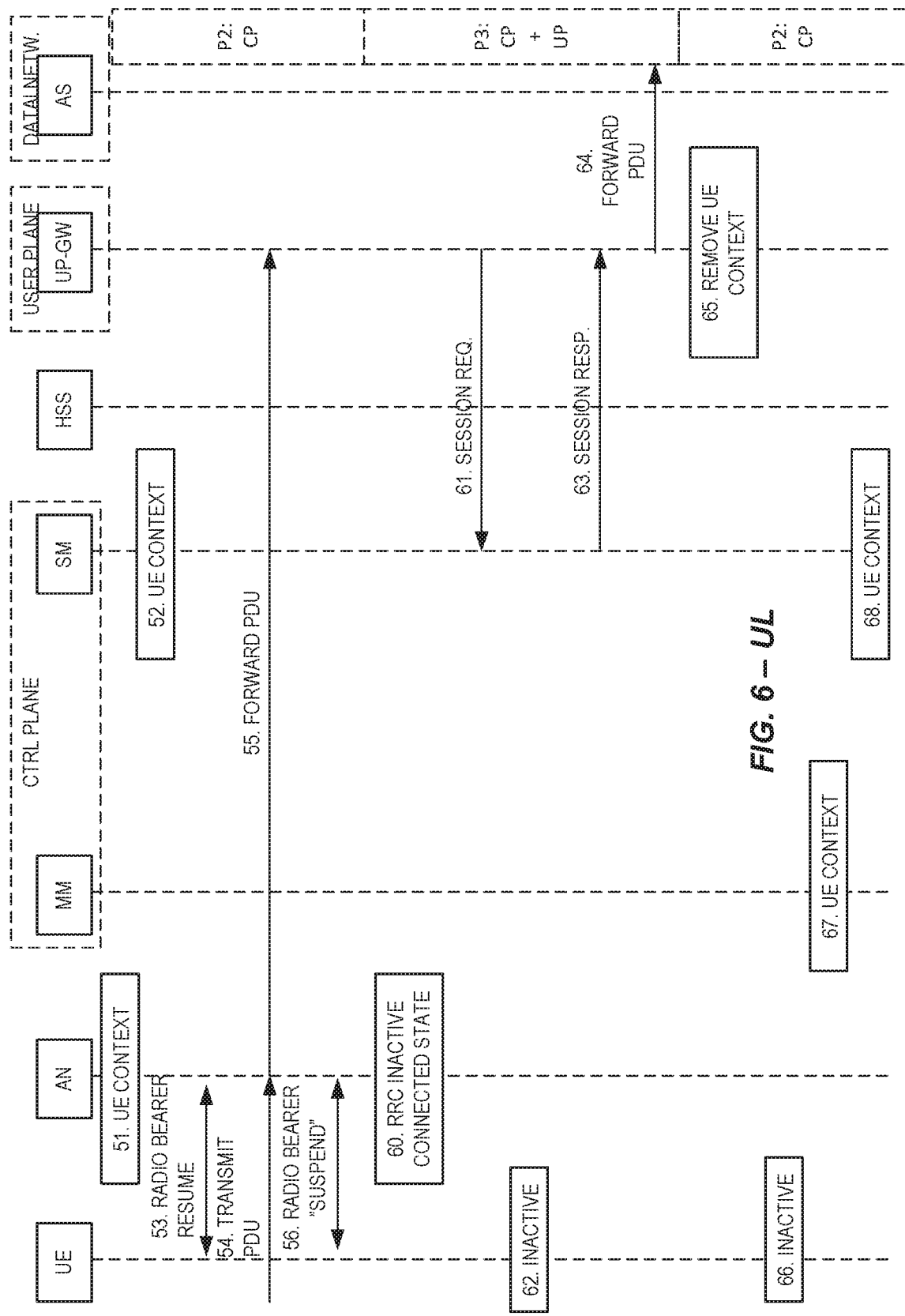

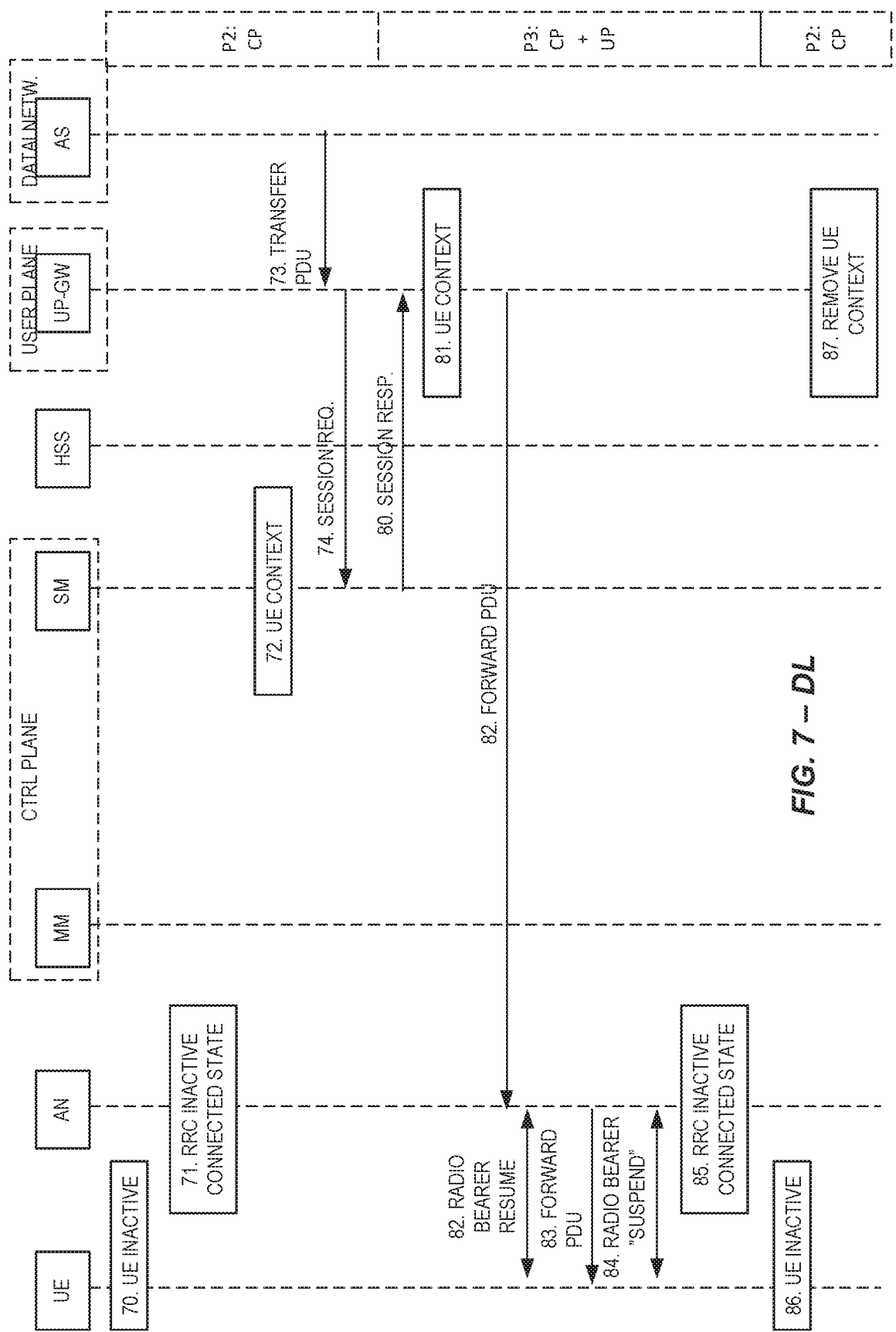
FIG. 7 – DL

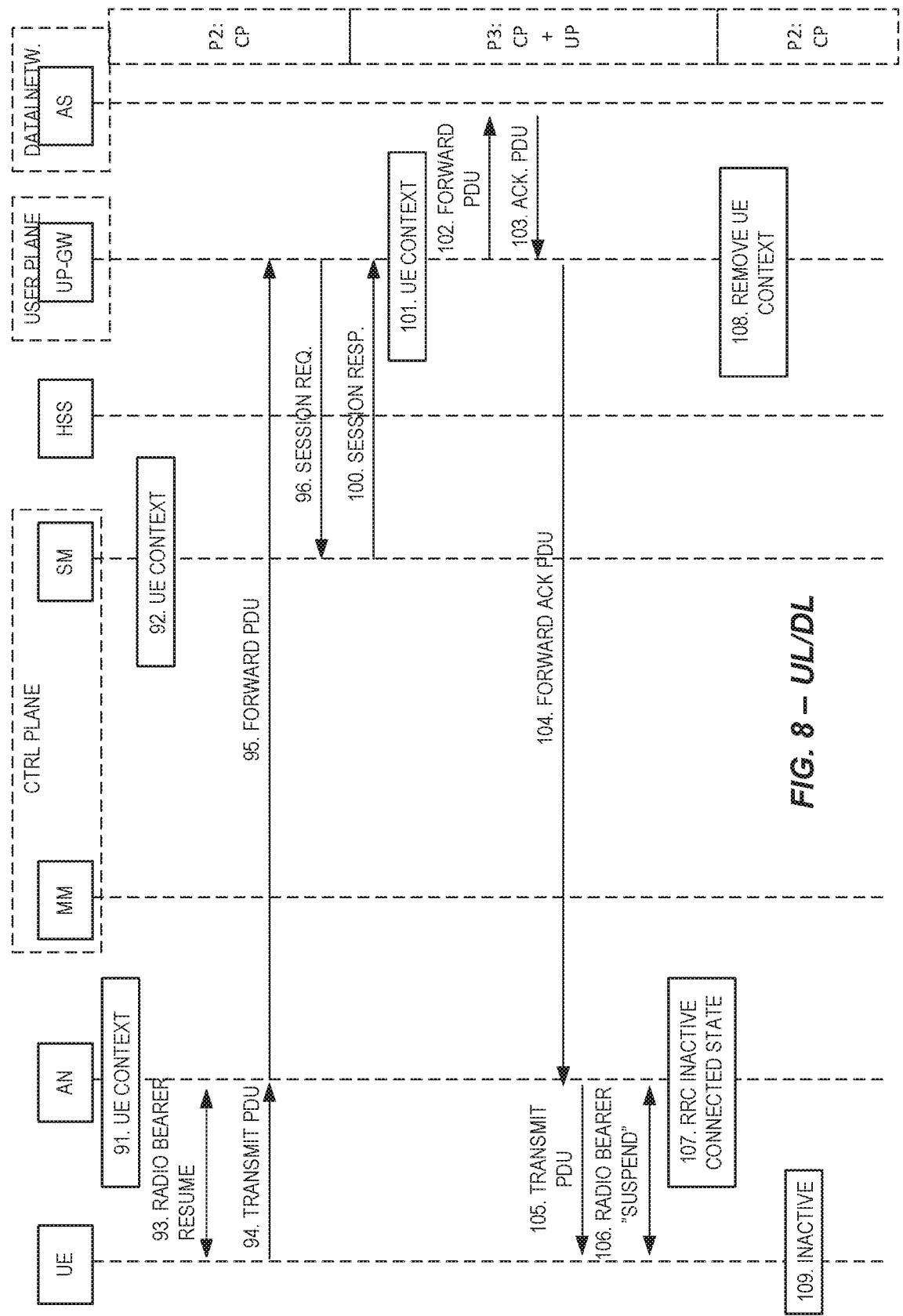
FIG. 8 – UL/DL

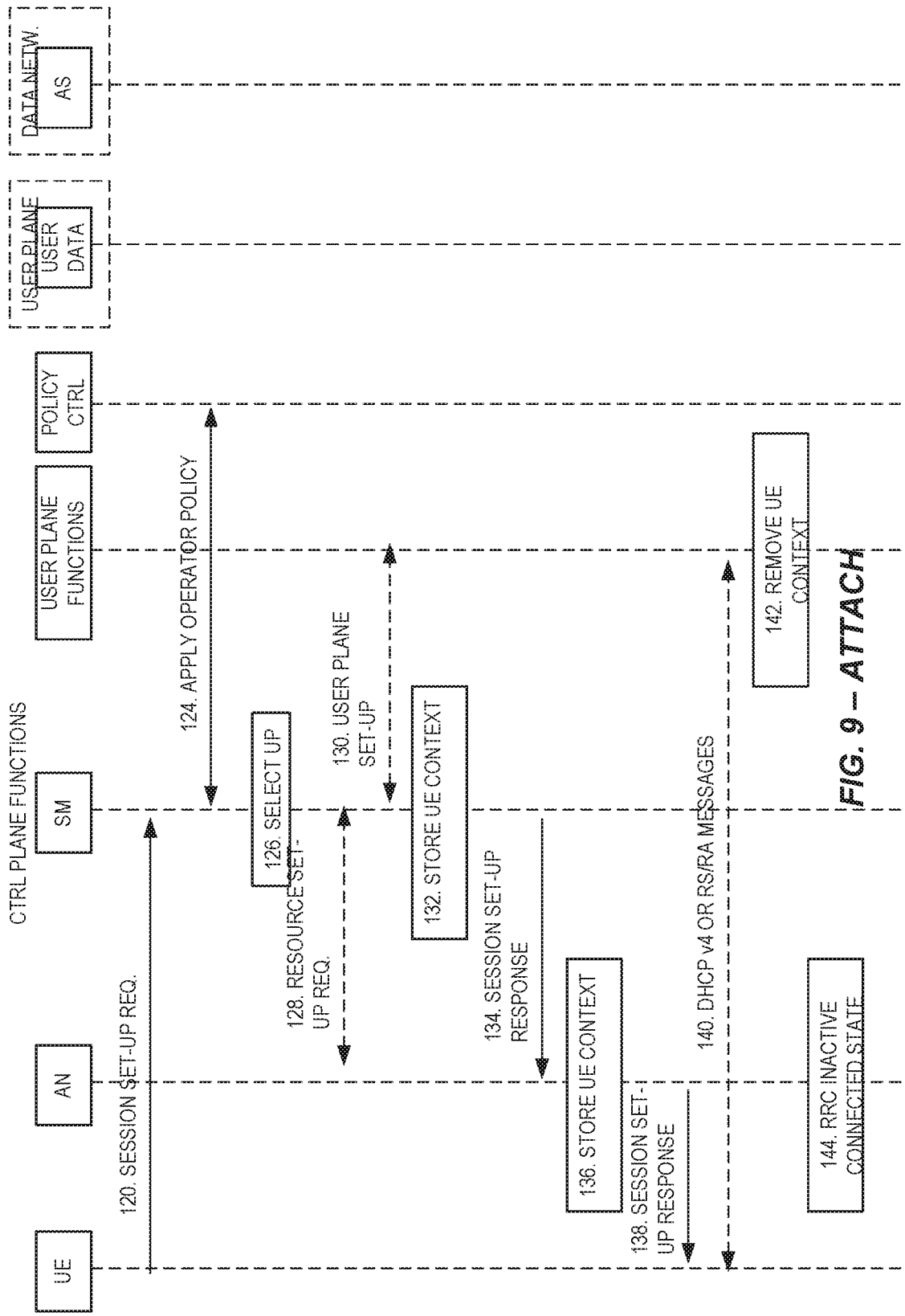

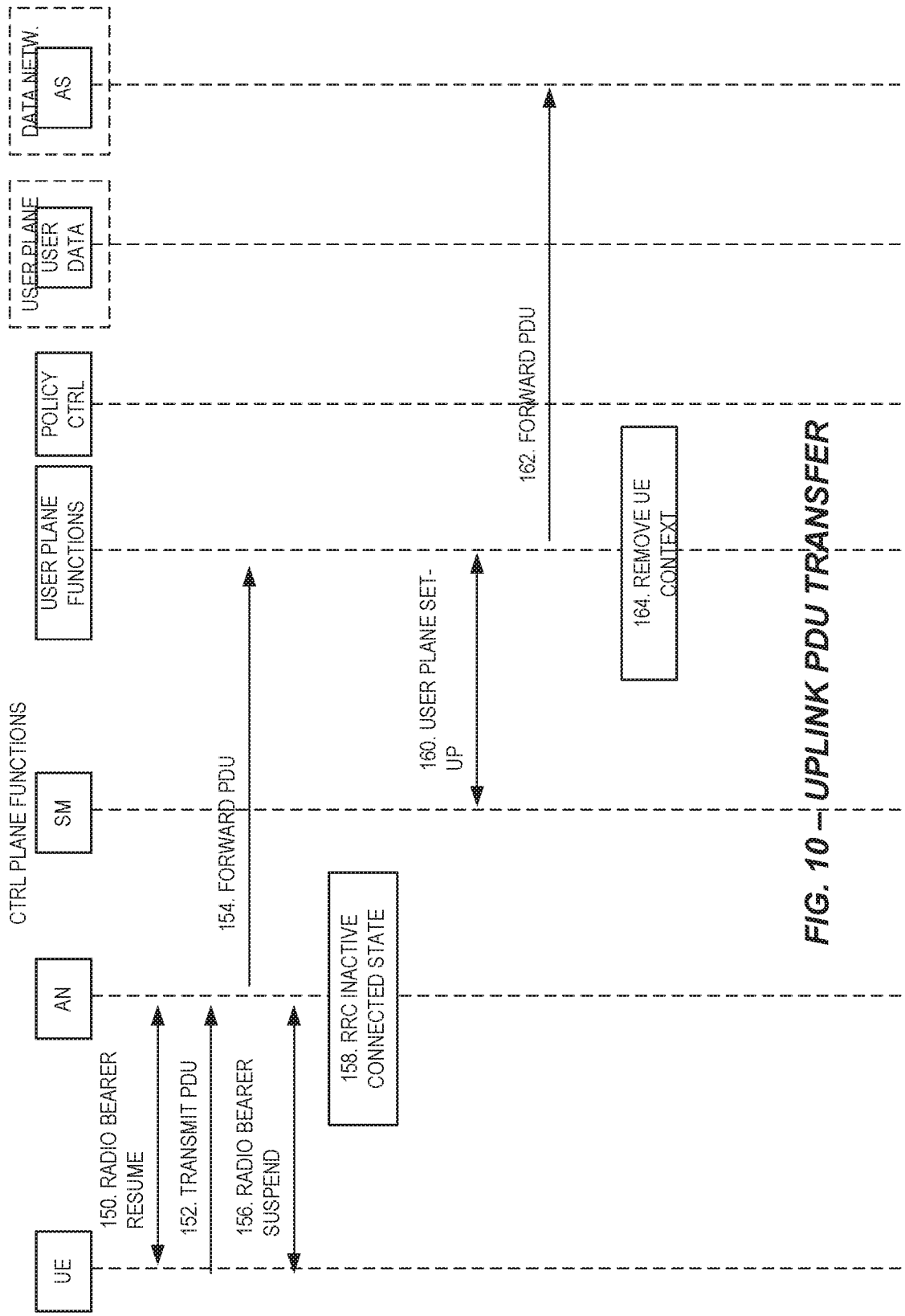
FIG. 10 – UPLINK PDU TRANSFER

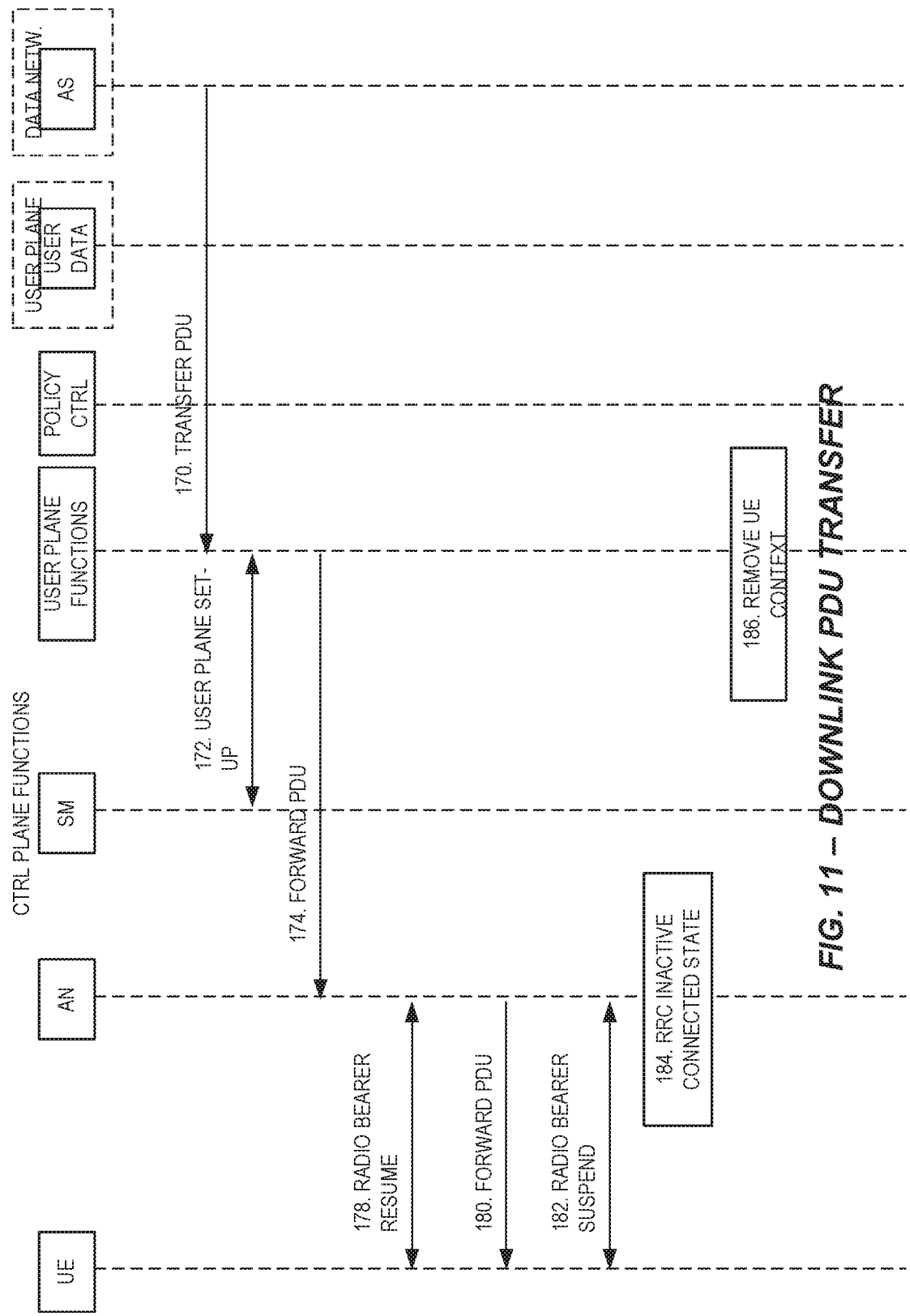
FIG. 11 – DOWNLINK PDU TRANSFER

EFFICIENT DELIVERY METHOD AND APPARATUSES FOR INFREQUENT SMALL DATA

RELATED APPLICATIONS

This application is a continuation of International Application No. PCT/EP2017/066677, filed Jul. 4, 2017, which claims the benefit of U.S. Provisional Application No. 62/358,490, filed Jul. 5, 2016 and International Application No. PCT/EP2016/065734, filed Jul. 4, 2016, the disclosures of which are hereby incorporated herein by reference in their entireties.

TECHNICAL FIELD

This invention is directed to delivery methods and apparatus for so-called infrequent small data. More particularly, the invention relates to Fifth Generation (5G) systems and methods allowing for efficient transmission of infrequent small data.

BACKGROUND

Machine Type Communication (MTC) where unattended wireless devices send their data over the Long Term Evolution (LTE) cellular network has been addressed in the art. In "Efficient Small Data Access for Machine-Type Communications in LTE," Sergey Andreev et al., IEEE ICC 2013—Next-Generation Networking Symposium, page 3569, 2013 methods are disclosed for accomplishing MTC deployments that feature a very large number of devices, whereas the data from a particular device may be infrequent and small. The paper suggests a contention-based LTE transmission mechanism, neither based on the default Physical Uplink Control Channel (PUCCH) based scheme, nor the alternative Physical Random Access Channel (PRACH) based scheme. It constitutes a simple implementation that has a fewer number of LTE signalling messages and is intended to provide better usage of network resources and lower power consumption for MTC devices.

Third Generation Partnership Project (3GPP) Technical Report (TR) 23.799 V0.5.0 (2016-05) Technical Specification Group Services and System Aspects; Study on Architecture for Next Generation System describes a system architecture for the next generation mobile networks. The new architecture supports at least the new Radio Access Technologies (RATs), the Evolved Universal Terrestrial Radio Access (E-UTRA), non-3GPP accesses and minimizes access dependencies.

SUMMARY

Systems and methods for efficient delivery of infrequent small data are provided. In some embodiments, a system for providing communication infrequent small Protocol Data Units (PDUs) to or from a User Entity (UE) includes an Access Node (AN); a session management functions node; and a User Plane (UP) functions entity. The session management functions node is operable to receive a session setup request from the UE and select the UP functions entity and a tunnel identifier associated with the UE. In case of an Internet Protocol (IP) PDU session type, the session management functions node is operable to trigger an establishment of a UP between the UP functions entity and the session management functions node. The UP functions entity is operable to create a UE context for the UE; store the UE context for the UE; complete an establishment in a Control Plane (CP); and provide the AN with uplink tunnel information. The AN is operable to store the UE context and transmit a session setup response to the UE. In this way, an improved ratio of the signalling/user data relation may be obtained for devices sending infrequent small data.

The legacy architecture for the Third Generation Partnership Project (3GPP) Core Network (CN) in Fourth Generation (4G), Third Generation (3G), etc. is signalling intensive. It is based on setting up connections through the CN, so called Packet Data Network (PDN) connections or Packet Data Protocol (PDP) contexts. The protocol used is the General Packet Radio Service (GPRS) Tunneling Protocol (GTP). GTP signalling in the CP is used to setup GTP User Plane (GTP-U) connections in the User Plane (UP). The UP is pre-established with a route through the CN and the connectivity is activated by signalling before data can be forwarded through the CN.

There are numerous reasons for using the connection oriented method for broadband delivery, such as providing guaranteed bitrate, policy, charging, etc. However, certain use cases may not require all this functionality, and infrequent small data may be such a use case. Other optimizations for small data exist in 4G for small data such as Data Over Non-Access Stratum (DO-NAS)), which has the drawback of sending data over signalling channels through control nodes.

One problem is to limit signalling in the CN in 5G for applications sending infrequent small data without the constraints provided by the legacy 3GPP architecture. Requirements for keeping states in the network may waste memory and other resources in the network due to the infrequent nature of infrequent small data services. Optimization of memory management is also motivated.

Hence, it is a first object of the invention to set forth methods and apparatuses for improving infrequent small data transmissions in 5G networks.

According to a first aspect of the invention, there is provided a system comprising an AN, a session management functions node or a CP Functions entity, a UP Functions entity, a policy control entity (e.g., a Home Subscriber Service (HSS), a policy control, etc.), the system interacting with a Data Network (DN). The system being adapted for: performing a connection establishment flow or attach procedure for communication infrequent small PDUs to or from a UE, wherein the system is being adapted for, upon the UE initiating a session setup request, the session management functions node selects the UP functions entity and a tunnel Identifier (ID) associated with the UE; in case of an IP PDU session type, the session management functions node triggers an establishment of a UP between the UP functions entity and the session management functions node, and a UE context is created in the UP functions entity. The session management functions node stores the UE context; the session management functions node completes the establishment in CP, and optionally in the UP, and provides the AN function with uplink tunnel information; the AN stores the UE context; and the AN transmits a response to the UE.

According to a further aspect of the invention there is provided a method for a session management functions node, or a CP Functions entity, interacting with an AN and an UP functions entity further interacting with a DN. A policy control entity (e.g., a HSS, a policy control, etc.), is also provided. The session management functions node being adapted for: taking part in a connection establishment flow or attach procedure for communication infrequent small PDUs to or from a UE, the method comprising the session management functions node receiving a session setup request from a UE; selecting the UP functions entity and a tunnel identifier associated with the UE; in case of an IP based PDU type, triggering an establishment of a UP between the UP functions entity and the session management functions node, whereby a UE context is created in the UP functions entity; storing the UE context; completing the establishment in CP; and providing the AN function with Uplink tunnel information.

According to a still further aspect of the invention, there is provided a method for a UP functions entity being adapted for: transferring small downlink PDUs to a UE that sends data infrequently, wherein the UE being attached to the network and wherein a PDU session is established, the UE is in Radio Resource Control (RRC) Inactive Connected State and no UE context being currently established in the UP functions entity; receiving a mobile terminated downlink PDU; if a UE context does not exist, requesting the session management functions node for the UE context and storing the UE context; encapsulating the PDU into a tunnel protocol header; and forwarding the PDU to the AN identified by the AN tunnel identifier part of the UE context.

According to a still further aspect of the invention there is provided a method for an AN, the AN being adapted for: interacting in a system comprising a session management functions node or a CP Functions entity, a UP Functions entity, a policy control entity (e.g., an HSS, a policy control, etc.), and a DN. The AN being adapted for:
 taking part in a connection establishment flow or attach procedure for communication infrequent small PDUs to or from a UE,
 receiving a request to setup resources, uplink tunnel information and a UE context from the session management functions node;
 storing the UE context;
 transmitting a session setup response to the UE; and
 moving the UE to RRC Inactive Connected State.

According to a still further aspect of the invention, there is provided AN, the AN being adapted for: interacting in a system comprising a session management functions node or a CP Functions entity, a UP functions entity, a policy control entity (e.g., an HSS, a policy control, etc.), and a DN, the AN comprising a processor and a memory having stored instructions therein. The AN is configured to carrying out taking part in a connection establishment flow or attach procedure for communication infrequent small PDUs to or from a UE, and further configured to: receive a request to setup resources, uplink tunnel information and a UE context from the session management functions node; store the UE context; transmit a session setup response to the UE; and move the UE to RRC Inactive Connected State.

There is also provided computer programs and computer program products for achieving this object.

Further advantages of the invention will appear from the following detailed description of the invention.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 2 shows session management states optimized for infrequent small data and session states;
FIG. 3 shows an exemplary scenario for infrequent small data and session states;
FIG. 4 shows an exemplary signalling flow for an attach procedure;
FIG. 5 shows further details to FIG. 4;
FIG. 6 is an exemplary signalling flow for sending uplink packets for infrequent small data;
FIG. 7 is an exemplary signalling flow for sending downlink packets for infrequent small data;
FIG. 8 is an exemplary signalling flow for sending acknowledged uplink packets for infrequent small data;
FIG. 9 shows an attach procedure according to a further alternative embodiment;
FIG. 10 shows an uplink Protocol Data Unit (PDU) transfer according to a further alternative embodiment;
FIG. 11 shows a downlink PDU transfer according to a further alternative embodiment.

DETAILED DESCRIPTION

Figure 1:
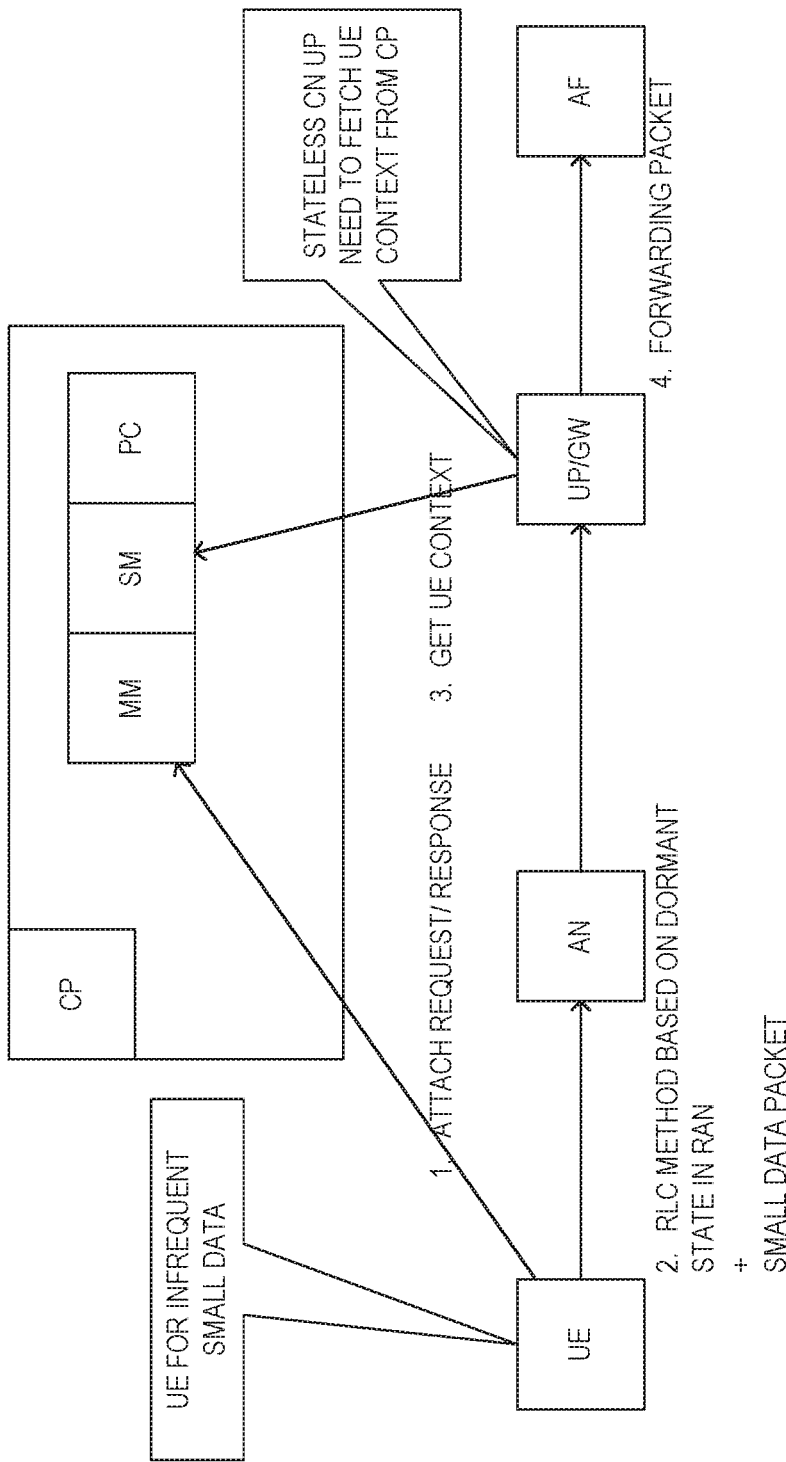
FIG. 1 shows an infrequent small data architecture.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

One embodiment of the present invention is related to the above-mentioned document, Technical Report (TR) 23.799 V0.5.0, 5.4 (key issue 4) on session management. This key issue addresses the scenario for users sending infrequent small user data with minimal signalling. Requirements under the Key issue 4 addresses "transfer infrequent small user data." The requirements are stated:
 How to efficiently transmit and receive infrequent small amounts of data through the Next Generation System, including studying whether sessions need to be established to enable such services.
 The solutions should allow for unidirectional transmission (i.e. uplink or downlink only transmission), efficient security mechanisms depending on user and/or operator needs, different options for addressing, charging, policing, inter-operator interworking.

DISCUSSION

The requirements listed in the section above refer to optimizations of performance ratios, as in the first bullet, as well as efficient functional solutions, as in the second bullet. Addressing the performance issues according to embodiments of the invention involves obtaining an optimized useful amount of user data transmitted through the New Radio (NR) system relative to signalling and other resources in the system. Other costs can also be considered, such as User Entity (UE) battery drainage, which mainly relates to signalling.

Signalling

Signalling for a registered UE can be due to mobility signalling and the session management. Mobility is considered in TR 23.799 V0.5.0, 5.3 (Key Issue number 3) mobility management framework. Furthermore, many infrequent small data devices are considered to be stationary, such as different kinds of sensors, etc. This kind of immobile devices may be optimized by work ongoing under Radio Access Network (RAN) groups related to new Inactive states in RAN.

Session management signalling related to maintaining transmission connectivity has traditionally been done by keeping connectivity states in the network and "moving" the UE context between different connectivity states. The efficiency of this type of signalling can be measured by the ratio of the amount of signalling to the amount of data transferred through the system. This cost ratio is directly depending on the length of the data session. The signalling cost of small data will be high compared to the cost for transferring a long sequence of data within one connectivity signalling phase. According to embodiments of the invention, optimizations for small data can be achieved by reducing state transitions and saving related signalling.

Memory Management

Keeping UE state information in contexts in the network ensures an efficient handling of functionality while also living up to the expected security provided to users and operators of Third Generation Partnership Project (3GPP) services. However, the memory cost ratio will be related to the frequency of the application activity, and for infrequent applications the cost of preserving continuous memory states in the NR network will be high relative to the short periods of activity. Therefore, according to embodiments of the invention, the network UE context memory is important to keep, but its handling is a candidate for optimization.

Functional Aspects

Unidirectional transmission, i.e., uplink or downlink only transmission: Unidirectional transmission may be considered for infrequent small data, but is not an intrinsically unique requirement for this type of application. There should be no difference in solutions for this aspect from other types of services.

Security mechanisms depending on user and/or operator needs: Security aspects may be handled for infrequent small data in the same way as other types of services through an integrated mechanism relying on Control Plane (CP) methods for mobility management, and in session management setting up Protocol Data Unit (PDU) session contexts, as well as relying on data integrity and protection as defined within RAN. Using unified methods, 3GPP may guarantee security for all types of applications.

Different Options for Addressing

Addressing options include Internet Protocol (IP) and non-IP data and potentially ethernet, etc. The method includes setting up PDU sessions for IP or non-IP data as described in the section for general session management. (Each PDU session is associated with a PDU session type that indicates what PDU type(s) are carried by the PDU Session. The PDU session type may be of IP type, ethernet type, or non-IP type.) Also, the infrequent small data service will be covered by the management of PDU sessions in the Core Network (CN) CP.

Different options for charging, policing, and inter-operator interworking: By integrating the small data applications in the PDU session management methods in the NR, CN PDU session handling aspects of charging, policing, and inter-working will not require specific implementations for small data.

Based on the description above, various embodiments for infrequent small data is provided. Some embodiments are based on the following principles:

Taking into account the work done in the RAN on mobility management, the solution already provided in the TR 23.799 under section 6.3.2 is reused. The method of the Radio Resource Control (RRC) inactive connected/RRC connected states is used. The UE context in CN is maintained in the connected state. The session management connectivity signalling is minimized, as mentioned in the TR in section 6.3.2:

RRC inactive connected to RRC connected state transition are inspired by the Suspend and Resume procedures defined for LTE in Release (Rel-) 13. Furthermore, no signalling to the CN is needed to perform this transition.

Using the RRC inactive connected/RRC connected states method in RAN, data is sent in the dedicated data channels, which RAN is viewing as an important imperative for efficient radio communication.

Furthermore, other optimization for small data in working progress in RAN is leveraged.

The infrequent small data may be supported by the session management utilizing generic session management methods for handling PDU sessions in the CN CP by preserving UE context states and procedures.

In order for optimizing the NR CN handling of infrequent small data in a CP/User Plane (UP) split environment, the maintaining of context information in the CN UP is questioned. It is proposed to introduce a new connected state in the CN, such that the CN CP maintains the Context for the device, while the CN UP doesn't need to preserve UE state information during long periods of UE inactivity. Resources and memory in the CN UP are freed up for other users. Since the UE Context state is preserved in the CN CP, the CN UP can fetch the UE context from the CN CP when needed. Note, that this handling of UE context information in the CN UP is an optional optimization for efficient CN UP.

According to aspects of the present invention, a Fifth Generation (5G) architecture of the CN may be arranged to have the following basic requirements and features:

The delivery may be IP based or non-IP based.

The method is based on using the methods in RAN developed for 5G, specifically the "RRC Inactive Connected/Active Connected" states and potential optimizations thereof.

CN CP UE contexts are established at attach or session setup.

CN CP preserves UE PDU session contexts as long as PDU session is maintained.

CN UP can refrain from preserving UE state information during inactive periods for the UE.

CN UP context and connectivity is established when UE originated or terminated packets need be forwarded in the UP.

After a packet is forwarded to/from the UE, a UE context is held for a short time in the CN UP to facilitate the server to send e.g., Acknowledgement (ACK) messages to/from the UE.

According to further aspects of the invention, various packet forwarding methods of embodiments of the invention have the following characteristics:

Uplink Transmission:

The UE transmits a packet to the Access Node (AN).

The AN uses a "Dormant state" (existing state for the UE) and appends a UE CN context identifier (UE Tunnel Endpoint Identifier (TEID), CP ID, etc.) which was established during a "Session Create" in the CP. (The "Dormant state" is called Radio Link Control (RLC) inactive connected state in 3GPP. Hence, in RAN there are two RLC states: the RLC Inactive Connected and the RLC Active Connected state.)

The CN UP gets an unrecognized uplink packet from the AN and fetches UE context from the CP based on parameters received from the AN.

The CN UP receives UE Context from the CP and forwards the packet towards the destination.

The CN UP keeps the state for a timer based time or time dependent on an end marker in a packet, and the UE then deletes the UE state.

Downlink Transmission:

The external server appends a UE context identifier on the packet (UE IP address or non-IP ID).

The CN UP gets the unrecognized packet from NGi interface and fetches UE context from the CP based on received parameters (UE IP address or non-IP ID).

The CN UP receives CP context from CP and uses parameters therein to forward the packet to the AN.

The CN UP keeps the state for a timer based time and then deletes the UE state.

By using an optimized delivery method, signalling is saved for setting up and maintaining CN UP contexts during long times when the UE may be sleeping anyway. Service request procedures are not needed. The ratio of signalling to user data is improved relative to 3G/4G. Allocation and locking up of resources in the CN UP is minimized. Memory is freed up. Less UE signalling is accomplished and better battery saving is accomplished.

In FIG. 1, there is shown an exemplary infrequent small data architecture and high level method (example uplink packet). The architecture is based on a split of the CP and the UP; the CP consists of a mobility management entity, a session management node, and a policy control. The UP consists of an access network (a.k.a., RAN) and the CN UP-Gateway (UP-GW). The CN UP can be stateless during inactive periods for the UE. A number of services may be available in the CN based on the UE context existing in the CP. Outside the 3GPP domain there is an Application Function (AF).

In FIG. 2, a state machine, optimized for infrequent small data, is shown. The session states reflect states for the perspective of the CN for a UE adapted for at least transceiving (transmitting and/or receiving) infrequent small data. The PDU session state is created by a "Create Session" method further shown in FIG. 2, comprising states P1, P2, and P3. A "No PDU session" state P1 is provided. There is moreover provided a session management PDU session state that can be in either of two sub-states, a "CP only" state P2 or a "CP+UP" state P3. In the "CP only" state P2, there exist only a UE context in the CP and no context for the UE in the UP, while in the "CP+UP" state P3, there exist contexts for the UE in both CP and UP planes. The transitions between the sub-states are further defined in FIG. 2.

The state transitions may be undertaken in the following way: Being in state P1, a connectivity request or response 10, effectuates a transition to P2, and a UE detach or connectivity release (such as depending on a timeout due to battery low) or other end occurrence 14 effectuates a transition from P2 to P1. In P2, the reception of data packets 11 effectuates a transition to P3, while in P3 an inactivity time lapse 12 brings about a transition to state P2.

Transitions may be triggered by a packet arriving in the UP for an un-known UE or a time out. When a packet for an unknown UE arrives in the UP, the UP shall fetch the UE context from the CP plane with the help of parameters identifying the UE in the packet. When the UE context is sent to the UP plane, the session management state machine transits to the state "CP+UP" state. Packets arriving in the UP in the "CP+UP" state can be handled directly and forwarded by the UP. After a time, the UE context is deleted in the UP and the session management state transits to the "CP only" state. In this state, the UE context continues to exist in the CP.

In FIG. 3, an exemplary scenario for infrequent small data is sketched. The above mentioned three states P1, P2, and P3 are indicated. Initially, at time t1, a UE adapted for transceiving infrequent small data is taken into use. Initially, the state of the UE is adopting a no PDU session P1 state. The UE attaches to the access network at t2, enters state P2, CP only, and at time t3, enters state P3, CP+UP, whereby the UE registers with the CN and transmits/receives PDUs, e.g., from an Application Server (AS) in a Data Network (DN). It should be noted that for some small data services typically aimed for the field of sensors, such as alarm or malfunction indicators and metering systems, may be characterized by very long periods of inactivity in relation to the duty time for data transmissions. Hence, the timing properties of FIG. 3 should not be understood as being directly representative but only illustrative.

In regard to the FIG. 3 example, the UE becomes inoperative at time t5 and enters a period of inactivity/dormant state, which from the perspective of the CN is treated as state P2. At some point in time, t6, the battery may be discharged, and keep alive signals or the like may not be present from the UE. Consequently, the CN may detach the UE and release the connectivity for the UE.

In the following, the states P1, P2, and P3 will be illustrated for the various procedures involved.

In FIG. 4, a detailed signalling flow for the initial phase of attaching and creating PDU session for infrequent small data, as well as data transmission, is shown. Note that the non-IP data case is shown, but the IP data case follows a similar procedure. The non-IP case is for UEs that don't use the IP communication protocol. Some other protocol may be used, and some other (e.g., application-specific) identifier instead of an IP address is used to identify the UE. In the IP case, the IP address will be assigned to the UE by the CN.

In step 32, the UE transmits an Attach request to the mobility management node, in the initial state P1, No PDU session. The UE exchanges (step 33) credentials and subscription data via the mobility management node, and from the Home Subscriber Server (HSS), the UE gets subscription data and becomes authenticated before the CN.

The mobility management node issues a connectivity request (step 34) for which no UP is established under which relevant parameters are assigned to the session. The session management allocates an UP-GW tunnel identity and CP tunnel for the PDU session for the UE in question (step 35).

The session management functions node stores a UE context (step 36) comprising, e.g., International Mobile Subscriber Identity (IMSI), device identity, UP-GW tunnel identity, and CP tunnel identity. The session management functions node responds to the mobility management node with a connectivity response message (step 37) comprising UP-GW tunnel identity and CP tunnel identity. At this point, the CN enters state P2, CP Only. Subsequently, the mobility management node issues an Attach Accept message (step 38) to the AN, which in turn responds with an RRC Setup message/attach accept message to the UE (step 39).

The procedure continues, now turning to FIG. 5, where the AN stores (step 41) in a context, relevant parameters for how to reach the UE in the CN CP. Upon subsequent inactivity from the UE, the session management functions node remains in state P2 while keeping the UE context (step 43) and the AN enters an RRC inactivity connected state (step 44). Ultimately, the UE is provided with a connectivity release (step 45) from the AN and is entering a dormant state, e.g., upon not responding or upon not sending keep alive signals to the AN.

Now turning to FIG. 6, a method is shown for uplink transmission. This embodiment is shown beginning at step 51, corresponding to step 41 of FIG. 5 in which a UE context is stored in the AN. In step 52, the UE context provided in step 36 of FIG. 4 remains stored in the session management functions node. The UE exchanges messages concerning (step 53) Radio Bearer Resume procedures with the AN. Then the UE is ready to transmit (step 54) a PDU to the AN, which forwards (step 55) the PDU to the UP-GW. This PDU is transmitted while the CN adopts a state P2, CP only.

After the small data is transmitted, the UE and AN perform a Radio Bearer Suspend procedure (step 56) and the AN adopts an (step 60) RRC Inactive Connected State. However, the CN adopts state P3.

At step 61, a Session Request is transmitted from the UP-GW to the session management functions node, which responds with a (step 63) Session Response. The CN adopts state P3. In the meantime, the UE is inactive (step 62).

Now, the UP-GW forwards the PDU (step 64) to the AS in the DN and the CN reverts to state P2. The UP-GW removes the UE context (step 65) and the UE remains inactive (step 66). The mobility management node updates the UE context (step 67) and the session management functions node updates (step 68) the UE context.

In FIG. 7, an embodiment for downlink traffic is shown. Again, the UE has undergone attach to the AN as shown in FIG. 5, steps 42, 43 and 44, and the AN is in RRC inactivity connected state (step 70). Step 71 corresponds to step 44 of FIG. 5. The CN adopts state P2. A UE context (step 72) is established in the session management functions node. The DN transfers a PDU (step 73) to the UP-GW, which issues a Session Request (step 74) to the session management functions node.

The session management functions node, on the other hand, responds with a session response (step 80) message to the UP-GW, which establishes a UE context (step 81). Now, the UP-GW forwards the PDU to the AN, which is applicable for the context in question. A Radio Bearer Resume (step 82) procedure follows between the AN and UE, and the PDU is transmitted to the UE (step 83). Upon reception, the AN and UE performs Radio Bearer "Suspend" (step 84) and the AN adopts an RRC Inactive Connected state (step 85). The UE is inactive (step 86), the CN reverts to state P2, and the UP-GW removes the UE context (step 87).

Some data sessions may involve uplink data concerning infrequent small data needing to be acknowledged by the UE. In FIG. 8, an embodiment for this procedure is shown. Again, attachment has been undertaken for the UE. A UE context (step 91) is present in the AN and in the session management functions node (step 92). The CN adopts state P2. The UE and the AN performs a Radio Bearer Resume (step 93) procedure and the UE transmits a PDU (step 94) to the AN which forwards (step 95) the PDU to the UP-GW. The UP-GW transmits a session Request (step 96) to the session management functions node, the CN adopts state P3, and the session management functions node responds with a session response (step 100) to the UP-GW, which establishes a UE context (step 101) for the UE in question.

Now the UP-GW forwards the PDU to the DN (step 102) and the AS in question acknowledges the PDU by the way of an ACK PDU message (step 103) to the UP-GW. The UP-GW forwards the ACK PDU to the AN (step 104), which forwards (step 105) the ACK message further to the UE. The UE and AN perform Radio Bearer "Suspend" (step 106) and the AN enters an RRC Inactive Connected state (step 107) for the UE. The UP-GW removes the UE context (step 108) and the UE enters an inactive state (step 109).

Hence, with reference to the above exemplary embodiments, some of the following advantages may be accomplished:

Providing a connectivity through the 5G NR CN, which is optimized for applications sending infrequent small data.

Building on the use of a "Dormant" state in the RAN, which means that fewer options are needed to be standardized and implemented.

The purpose is to obtain an optimized ratio of the signalling/user data relation for Internet of Things (IoT) devices without being forced to send user data in the CP (as in the 4G Data Over Non-Access Stratum (DO-NAS) solution).

In FIG. 9 an alternative embodiment of a connection establishment flow or attach procedure for communication infrequent small data is shown. It is assumed for this procedure that the UE is attached to the network. As part of the attach procedure, subscription data is fetched from the Subscriber Data Management function. The UE initiates a session setup request (step 120). The UE provides information indicating the PDU session type (e.g., non-IP/IP). indication of the DN network name may also be included.

The session management function may interact with the policy control function which determines the Quality of Service (QoS) property of the connection based on information such as UE request and operator policy (step 124). Note: how the QoS related property is set per operator policy is per the solutions developed for the QoS and Policy Framework Key Issues. The session management function selects the proper UP function and a tunnel identifier associated with the UE (step 126). In cases where the connection type is IP, the session management function assigns IPv4 address/IPv6 prefix anchored in the UP function. The session management function may request the AN to setup resources for the session (step 128).

In case of an IP based connection type, the session management function triggers the establishment of a UP to enable IPv6 stateless address auto-configuration or Dynamic Host Configuration Protocol Version 4 (DHCPv4) options for IP address/prefix allocation after the PDU session is established (step 130). In this case, the DHCPv4 or RS/RA messages will be forwarded by the UP function between UE and the CP functions entity. A UE context is created in the UP function.

This step is not needed for the option that the IPv4 address or IPv6 prefix is provided in the protocol over the CP between the UE and the CP Functions. Note: In case of Non-IP, step 130 might not be needed.

The session management function stores the UE context with all necessary UE and PDU session data (step 132). The session management function completes the establishment in CP and optionally in UP and provides the AN function with uplink tunnel information (step 134). Note: Other information may be transferred, such as QoS, max bit rates, etc.

The AN function stores the UE context (step 136). Session setup is complete (step 138. In case IP, IPv6 stateless address auto-configuration or DHCPv4 procedure may be triggered between UE and the session management function over the UP and the CP between session management and UP functions entity (step 140).

In case IP PDU session type, after that the IPv6 stateless address auto-configuration or DHCPv4 allocation procedure is finished, the UP functions entity deletes the UE context (step 142) to release resources that otherwise had been unnecessarily allocated during a possible long UE inactivity period. Due to, e.g., user inactivity during a period, the AN function moves the UE to RRC Inactive Connected State (step 144).

In FIG. 10 an alternative embodiment is shown, wherein a small Uplink PDU is transferred from a UE device that sends small data infrequently. It is assumed for this procedure that the UE is attached to the network and that a PDU session is established, the UE is in RRC Inactive Connected State and no UE context is currently established in the UP functions entity. The UE and the AN performs the Radio Bearer Resume procedure (step 150) to setup radio bearer between UE and AN. The UE transmits the PDU (step 152) to the AN and indicates that this is the last PDU to be transmitted for this time.

The AN encapsulates the PDU into a tunnel protocol header and forwards the PDU to the UP functions indicated by the tunnel identifier part of the UE context (step 154). The AN may enforce, e.g., QoS marking, rate limiting, etc. After the AN has forward the PDU, AN initiates the Radio Bearer Suspend procedure with the UE triggered by last PDU marking or due to UE inactivity (step 156). The UE is moved to the RRC Inactive Connected State (step 158).

The UP functions entity receives the uplink PDU, and if the UE context does not exist, the UP functions entity requests the proper CP functions entity for the UE context and stores it (step 160). The CP functions entity is identified by a tunnel identifier. In case that a UE context already exists in the UP functions entity, this step is omitted. The UP functions entity forwards (step 162) the PDU to the DN utilizing the PDU destination IP address in case of IP PDU session type. The UP functions may enforce, e.g., QoS marking, charging, etc. The UP functions entity optionally removes the UE context (step 164) according to, e.g., a last PDU marking or, e.g., due to inactivity.

In FIG. 11, an alternative embodiment is shown of how a small downlink PDU is transferred from a DN to a UE device that sends small data infrequently. It is assumed for this procedure that the UE is attached to the network and that a PDU session is established, the UE is in RRC Inactive Connected State and no UE context is currently established in the UP functions entity. The AS in the DN transfers a mobile terminated PDU towards the UP functions entity (step 170). In the case of IP, the destination address is the IP address of the UE device. The UP functions entity receives the downlink PDU and if the UE context does not exist, the UP functions entity requests the proper CP functions entity for the UE context and stores it (step 172). In the case of IP, the IP address is used to derive the proper session management function.

In the case that a UE context already exists in the UP functions entity, this step is omitted. The UP functions entity encapsulates the PDU into a tunnel protocol header and forwards the PDU to the AN identified by the AN tunnel identifier part of the UE context (step 174). The UP functions may enforce, e.g., QoS marking, rate limiting, charging, etc.

When the AN receives the PDU, the Radio Bearer Resume procedure is initiated after a successful paging procedure (step 178). The AN forwards the PDU to the UE after the radio bearer is resumed (step 180). After the AN has forwarded the PDU, the AN initiates the Radio Bearer Suspend procedure (step 182) with the UE, e.g., due to UE inactivity. The UE is moved to RRC Inactive Connected State (step 184). The UP functions entity optionally removes the UE context (step 186) due to, e.g., inactivity.

Figure 12:
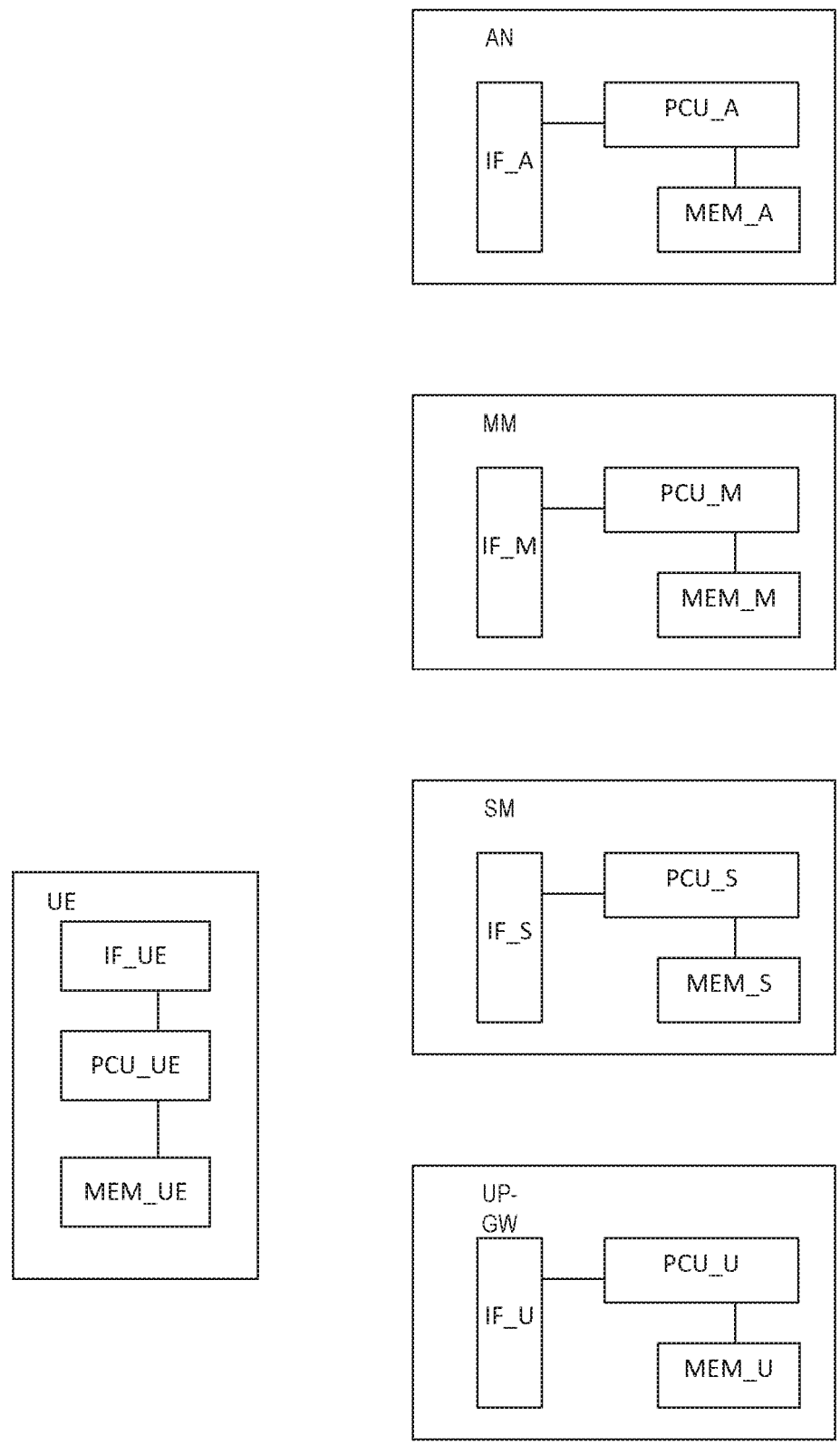
FIG. 12 shows embodiments of an Access Node (AN), a mobility management node, a session management node, a User Plane Gateway (UP-GW), and a User Entity (UE)

In FIG. 12, embodiments of an AN, a mobility management node, a session management node, and a UP-GW are shown. The AN comprises a processor PCU_A and a memory MEM_A having stored therein instructions being configured to, when carried out on the processor PCU_A, carry out the steps shown in the figures above. The AN moreover comprising an interface IF_A through which the AN communicates with other nodes.

The mobility management node comprises a processor PCU_M and a memory MEM_M having stored therein instructions being configured to, when carried out on the processor PCU_M, carry out the steps shown in the figures above. The mobility management node moreover comprising an interface IF_M through which the mobility management node communicates with other nodes.

The session management functions node comprises a processor PCU_S and a memory MEM_S having stored therein instructions being configured to, when carried out on the processor PCU_S, carry out the steps shown in the figures above. The session management functions node moreover comprising an interface IF_S through which the session management functions node communicates with other nodes.

The UP-GW comprises a processor PCU_U and a memory MEM_U having stored therein instructions being configured to, when carried out on the processor PCU_U, carry out the steps shown in the figures above. The UP-GW moreover comprising an interface IF_G through which the UP_GW communicates with other nodes.

There is also shown a UE comprising a processor UE_PCU, memory, UE_MEM, and an interface UE_IF. The processor is adapted to carry out instructions as described above, wherein the instructions are adapted to be stored in the memory UE_MEM. The UE communicates with the AN through the interface UE-IF.

A computer program or computer program product is provided, which is adapted to carry out the method steps defined above.

The methods discussed above may alternatively be implemented by means of a system based on network functions virtualization.

Figure 13:
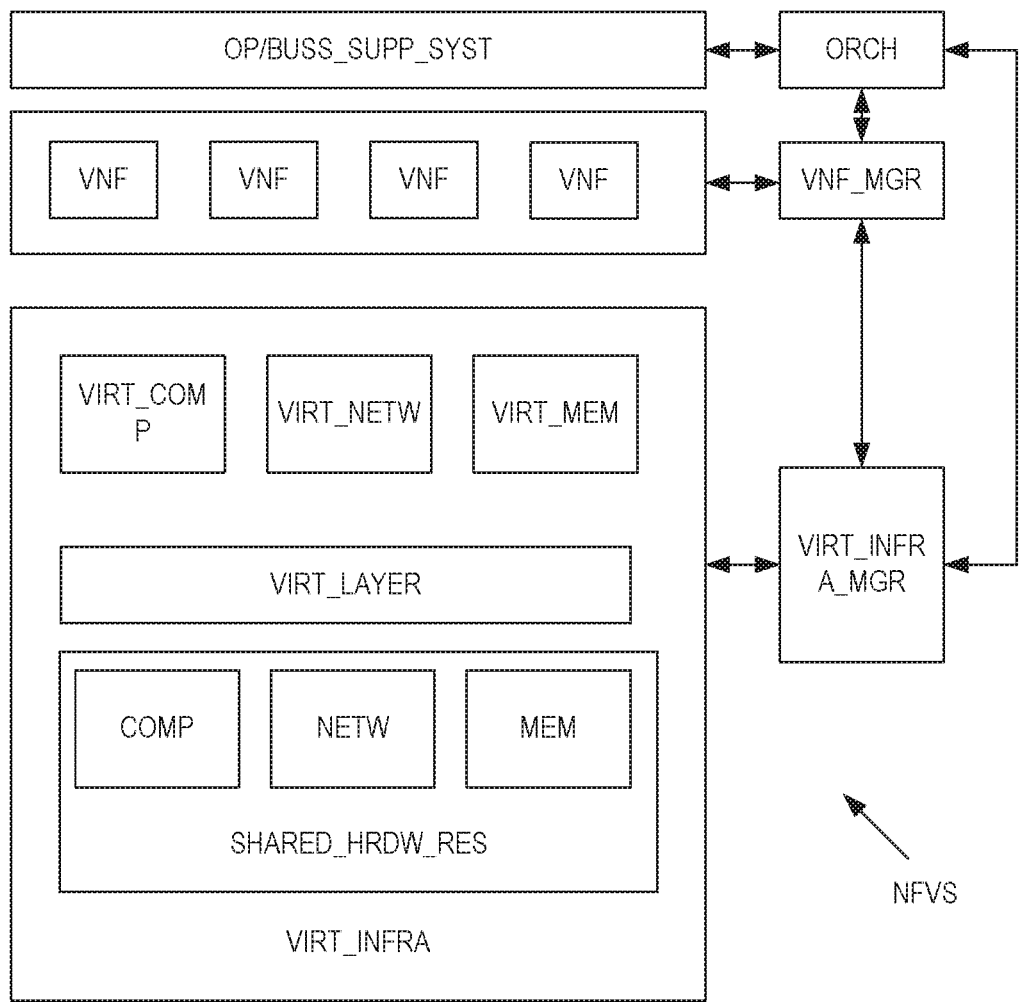
FIG. 13 shows a cloud implementation.

In FIG. 13, further embodiments of the invention are implemented by means of such a Network Function Virtualization System (NFVS) formed on, e.g., general purpose servers, standard storage, and switches. The NFVS may be arranged along the lines described in FIG. 4, ETSI GS NFVS 002 V. 1.1.1 (2013-10) and comprises the following elements: A NFVS management and orchestration system comprising an Orchestrator, ORCH, a Virtual Network Function (VNF) manager VNF_MGR, and a virtualised infrastructure manager, VIRT_INFRA_MGR. The NFVS moreover comprises an operational/business support system OP/BUSS_SUPP_SYST; a number of VNF instances by which the method steps explained above are instantiated; and a virtualised infrastructure VIRT_INFRA. The VIRT_INFRA comprises a virtual computing VIRT_COMP; virtual network VIRT_NETW; virtual memory VIRT_MEM; a virtualisation layer VIRT_LAYER (e.g. hypervisor); and shared hardware resources SHARED_HARDW_RES comprising computing devices COMP; network devices NETW comprising, e.g., standard switches and other network devices; and standard data storage devices MEM.

The following acronyms are used throughout this disclosure.

3GPP Third Generation Partnership Project
4G Fourth Generation
5G Fifth Generation
ACK Acknowledgement
AF Application Function
AN Access Node
AS Application Server
CN Core Network
COMP Computing Device
CP Control Plane
CTRL Control
DHCP Dynamic Host Configuration Protocol
DN Data Network
DO-NAS Data Over Non-Access Stratum
E-UTRA Evolved Universal Terrestrial Radio Access
GPRS General Packet Radio Service
GTP General Packet Radio Service Tunneling Protocol
GTP-U General Packet Radio Service Tunneling Protocol User Plane
HSS Home Subscriber Service
ID Identifier
IMSI International Mobile Subscriber Identity
IoT Internet of Things
IP Internet Protocol
LTE Long Term Evolution
MTC Machine Type Communication
NAS Non-Access Stratum
NFVS Network Function Virtualization System
NR New Radio
ORCH Orchestrator
PDN Packet Data Network
PDP Packet Data Protocol
PDU Protocol Data Unit
PRACH Physical Random Access Channel
PUCCH Physical Uplink Control Channel
QoS Quality of Service
RAN Radio Access Network
RAT Radio Access Technology
RLC Radio Link Control
RRC Radio Resource Control
TEID Tunnel Endpoint Identifier
TR Technical Report
UE User Entity
UP User Plane
UP-GW User Plane Gateway
VNF Virtual Network Function Those skilled in the art will recognize improvements and modifications to the embodiments of the present disclosure.

All such improvements and modifications are considered within the scope of the concepts disclosed herein and the claims that follow.

What is claimed is:

1. A 3rd Generation Partnership Project (3GPP) system for performing a connection establishment flow or attach procedure for communication of infrequent small Protocol Data Units (PDUs) to or from a User Entity (UE) comprising:
    an Access Node (AN);
    a session management functions node; and
    a User Plane (UP) functions entity; and
    where the session management functions node is operable to:
        receive a session setup request from the UE;
        select the UP functions entity and a tunnel identifier associated with the UE;
        determining that a session type is an Internet Protocol (IP) PDU session type:
            in response to determining that the session type is an IP PDU session type, trigger an establishment of a UP between the UP functions entity and the session management functions node by engaging in UP set-up signalling between the UP functions entity and the session management functions node; and
            the UP functions entity is operable to create a UE context for the UE; store the UE context for the UE;
        complete the establishment in a control plane (CP); and
        provide the AN with the UE context and Uplink tunnel information;
    the AN is operable to:
        receive a session setup response comprising the UE context;
        store the UE context; and
        transmit the session setup response to the UE;
        upon user inactivity during a period, the AN moving the UE to a Radio Resource Control (RRC) Inactive Connected State;
    where the UP functions entity is operable to, after the period, remove the UE context;
    where infrequent small data relates to a predefined data use type, that is different from a data use type such as a mobile broadband data use type, and that involves infrequent use of data in relation to the mobile broadband data use type and smaller amounts of data than the mobile broadband data use type.

2. The 3GPP system according to claim 1, wherein the UP functions entity is operable to remove the UE context after finishing an IP version 6 (IPv6) stateless address autoconfiguration or Dynamic Host Configuration Protocol in IP version 4 (DHCPv4) allocation procedure.

3. The 3GPP system according to claim 1 wherein the UE is attached to a cellular communications network, has a PDU session established, is in the RRC Inactive Connected State, and the UE is operable to:
    transmit an uplink PDU to the AN where the uplink PDU indicates that this is the last PDU to be transmitted; and
    wherein the AN is further operable to:
        encapsulate the uplink PDU into a tunnel protocol header;
        forward the uplink PDU to the UP functions entity indicated by a tunnel identifier part of the UE Context; and
        move the UE to the RRC Inactive Connected State;
    wherein the UP functions entity is further operable to:

receive the uplink PDU;
if the UE Context does not exist in the UP functions entity, request the session management functions node for the UE context and store the UE context;
forward the uplink PDU to a data network utilizing a PDU destination IP address in case of an IP PDU session type; and
remove the UE context according to a last PDU marking or due to inactivity.

4. The 3GPP system according to claim 1, wherein the UP functions entity is further operable to:
receive a mobile terminated downlink PDU;
if the UE context does not exist in the UP functions entity, request the session management functions node for the UE context and store the UE context;
encapsulate the mobile terminated downlink PDU into a tunnel protocol header; and
forward the mobile terminated downlink PDU to the AN identified by an AN tunnel identifier part of the UE context;
wherein the AN is further operable to:
forward the mobile terminated downlink PDU to the UE; and
move the UE to the RRC Inactive Connected State; and
wherein the UP functions entity is further operable to:
remove the UE context due to inactivity.

5. The 3GPP system according to claim 1 wherein the session management functions node is a CP Functions entity.

6. A method of operating a session management functions node for communicating infrequent small Protocol Data Units (PDUs) to or from a User Entity (UE) where the UE is in a Radio Resource Control (RRC) Inactive Connected State and no UE context is currently established in a User Plane (UP) functions entity, the method comprising:
receiving a session setup request from the UE through an Access Node (AN);
selecting the UP functions entity and a tunnel identifier associated with the UE;
determining that a session type is an Internet Protocol (IP) based PDU type, triggering an establishment of a UP between the UP functions entity and the session management functions node by engaging in UP set-up signalling between the UP functions entity and the session management functions node whereby the UE context is created in the UP functions entity;
storing the UE context; and
completing the establishment in a control plane (CP) and providing the AN with the UE context and uplink tunnel information;
where infrequent small data relates to a predefined data use type, that is different from a data use type such as a mobile broadband data use type, and that involves infrequent use of data in relation to the mobile broadband data use type and smaller amounts of data than the mobile broadband data use type.

7. The method according to claim 6, further comprising:
receiving a request from the UP functions entity for the UE context where the UE is attached to a cellular communications network and a PDU session is established, the UE is in the RRC Inactive Connected State and no UE context is currently established in the UP functions entity, wherein a Radio bearer is resumed between the UE and the AN and the UE transmits a PDU to the AN and indicates that this is the last PDU to be transmitted for a period; and
upon being requested by the UP functions entity for the UE context, providing the UE context to the UP functions entity.

8. A method of operating a User Plane (UP) functions entity for transferring small uplink Protocol Data Units (PDUs) from a User Entity (UE) that sends data infrequently to a data network, the UP functions entity interacting with an Access Node (AN) and a Control Plane (CP) functions entity, each node of a plurality of nodes and each entity of the plurality of entities forming a 3GPP system, the method comprising:
receiving, from the AN, an uplink PDU that is encapsulated into a tunnel protocol header where the tunnel protocol header is indicated by a tunnel identifier part of a UE context for the UE where the UE is in a Radio Resource Control (RRC) Inactive Connected State and no UE context is currently established in the UP functions entity;
determining that the UE context does not exist in the UP functions entity, in response to determining that the UE context does not exist in the UP functions entity, requesting a session management functions node for the UE context and storing the UE context;
forwarding the uplink PDU to the data network utilizing a PDU destination IP address in case of an IP PDU type; and
removing the UE context according to a last PDU marking or due to inactivity;
where infrequent small data relates to a predefined data use type, that is different from a data use type such as a mobile broadband data use type, and that involves infrequent use of data in relation to the mobile broadband data use type and smaller amounts of data than the mobile broadband data use type.

9. A method of operating a User Plane (UP) functions entity for transferring small downlink Protocol Data Units (PDUs) to a User Entity (UE) that sends data infrequently, the method comprising:
receiving a mobile terminated downlink PDU for the UE where the UE is attached to an Access Node (AN) and a PDU session is established, the UE is in a Radio Resource Control (RRC) Inactive Connected State and no UE context is currently established in the UP functions entity, each node of a plurality of nodes and each entity of the plurality of entities forming a 3GPP system;
determining that the UE context does not exist in the UP functions entity, in response to determining that the UE context does not exist in the UP functions entity, requesting a session management functions node for the UE context and storing the UE context;
encapsulating the mobile terminated downlink PDU into a tunnel protocol header and forwarding the mobile terminated downlink PDU to the AN identified by an AN tunnel identifier part of the UE context; and
removing the UE context due to inactivity.

10. A method of operating an Access Node (AN) for taking part in a connection establishment flow or attach procedure for communication of infrequent small Protocol Data Units (PDUs) to or from a User Entity (UE) in a cellular communications network comprising a Session Management (SM) functions node or a Control Plane (CP) Functions entity, a User Plane (UP) Functions entity communicating with a data network, a policy control entity, each node of a plurality of nodes and each entity of the plurality of entities forming a 3GPP system, the method including:

receiving, from the SM functions node, a request to setup resources, uplink tunnel information, and a UE context;

storing the UE context;

transmitting a session setup response to the UE; and moving the UE to a Radio Resource Control (RRC) Inactive Connected State;

where infrequent small data relates to a predefined data use type, that is different from a data use type such as a mobile broadband data use type, and that involves infrequent use of data in relation to the mobile broadband data use type and smaller amounts of data than the mobile broadband data use type.

11. The method according to claim 10 further comprising:

receiving an uplink PDU from the UE where the UE is attached to the cellular communications network and a PDU session is established, the UE is in the RRC Inactive Connected State and no UE context is currently established in the UP functions entity;

encapsulating the uplink PDU into a tunnel protocol header and forwarding the uplink PDU to the UP functions entity indicated by a tunnel identifier part of the UE context; and moving the UE to the RRC Inactive Connected State.

12. The method according to claim 10 further comprising:

receiving a downlink PDU for the UE;

forwarding the downlink PDU to the UE; and moving the UE to the RRC Inactive Connected State.

13. An Access Node (AN) for taking part in a connection establishment flow or attach procedure for communication of infrequent small Protocol Data Units (PDUs) to or from a User Entity (UE) in a cellular communications network comprising a Session Management (SM) functions node or a Control Plane (CP) Functions entity, a User Plane (UP) Functions entity communicating with a data network, a policy control entity, each node of a plurality of nodes and each entity of the plurality of entities forming a 3GPP system, the AN comprising:

a processor; and a memory having stored instructions therein whereby the AN is operable to:

receive, from the SM functions node, a request to setup resources, uplink tunnel information, and a UE context;

store the UE context;

transmit a session setup response to the UE; and move the UE to a Radio Resource Control (RRC) Inactive Connected State;

where infrequent small data relates to a predefined data use type, that is different from a data use type such as a mobile broadband data use type, and that involves infrequent use of data in relation to the mobile broadband data use type and smaller amounts of data than the mobile broadband data use type.

14. The AN according to claim 13 further operable to:

receive an uplink PDU from the UE where the UE is attached to the cellular communications network and a PDU session is established, the UE is in the RRC Inactive Connected State and no UE context is currently established in the UP functions entity;

encapsulating the uplink PDU into a tunnel protocol header and forwarding the uplink PDU to the UP functions entity indicated by a tunnel identifier part of the UE context; and move the UE to the RRC Inactive Connected State.

15. The AN according to claim 13 further operable to:

receive a downlink PDU for the UE;

forward the downlink PDU to the UE; and move the UE to the RRC Inactive Connected State.

\* \* \* \* \*